(12) United States Patent
Johst et al.

(10) Patent No.: US 10,702,960 B2
(45) Date of Patent: Jul. 7, 2020

(54) ROBOT TO MOVE A SUPPORT PLATFORM ALONG A FLANGE CONNECTION

(71) Applicant: ADMEDE AB, Malmö (MA)

(72) Inventors: Kenneth Johst, Frederiksberg C (DK); Lars Jagd, Malmö (SE); Gerald Marinitsch, Kalsdorf (AT)

(73) Assignee: ADMEDE AB (SE)

( * ) Notice: Subject to any disclaimer, the term of this patent is extended or adjusted under 35 U.S.C. 154(b) by 0 days.

(21) Appl. No.: 16/071,870

(22) PCT Filed: Jan. 19, 2017

(86) PCT No.: PCT/EP2017/051082
§ 371 (c)(1),
(2) Date: Jul. 20, 2018

(87) PCT Pub. No.: WO2017/125493
PCT Pub. Date: Jul. 27, 2017

(65) Prior Publication Data
US 2019/0030665 A1    Jan. 31, 2019

(30) Foreign Application Priority Data

Jan. 21, 2016    (EP) ..................... 16152183

(51) Int. Cl.
*B23P 19/06*    (2006.01)
*F03D 13/10*    (2016.01)

(52) U.S. Cl.
CPC ............ *B23P 19/067* (2013.01); *F03D 13/10* (2016.05); *F05B 2240/912* (2013.01); *F05B 2260/301* (2013.01)

(58) Field of Classification Search
CPC .. B23P 19/067; B23P 19/06; Y10T 29/53983; Y10T 29/49831;
(Continued)

(56) References Cited

U.S. PATENT DOCUMENTS 4,883,185 A * 11/1989 Fujitani ................. B23P 19/001
212/273
2013/0185932 A1    7/2013 Imi

FOREIGN PATENT DOCUMENTS

EP    2 607 685    3/2014

OTHER PUBLICATIONS

PCT/EP2017/051082, Mar. 28, 2017, International Search Report and Written Opinion.

* cited by examiner

*Primary Examiner* — Matthew P Travers
(74) *Attorney, Agent, or Firm* — Workman Nydegger (57) ABSTRACT

Robot (1) to move a support platform (6) along a series of nuts (2) pre-screwed on bolts (3) arranged in a linear or in particular curved flange connection (4). The bolts (3) project from the nuts (2) pre-screwed in substantially a nut plane (13) by a projection length (15). The robot (1) comprises a drive to move the robot (1) along the curved flange connection (4). The drive comprises at least one drive element (12) and holding means (11) both connected to the support platform (6), wherein the holding means (11) comprise at least one pair of guiding rails (16, 17) connected to the support platform (6) in a distance from each other of more than the diameter (D) of the bolts (3) and less than the width across flat (AF) of the nuts (2) and projecting more than the projection length (15) from the support platform (6).

14 Claims, 6 Drawing Sheets

(58) Field of Classification Search
CPC . Y10T 29/49948; B25B 21/002; B25B 29/02;
B25B 21/00; F05B 2260/301; F05B
2230/60; F03D 13/10
See application file for complete search history.

ROBOT TO MOVE A SUPPORT PLATFORM ALONG A FLANGE CONNECTION

The present invention is related to a robot to move a support platform along a series of nuts pre-screwed on bolts arranged in a linear or in a particular curved flange connection, which bolts project from the nuts pre-screwed in substantially a nut plane by a projection length, which robot comprises a drive to move the robot along the curved flange connection, which drive comprises at least one drive element and holding means both connected to the support platform.

The present invention is furthermore related to a method to move a robot with a support platform along a series of nuts pre-screwed on bolts arranged in a linear or in a curved flange connection, which bolts project from the nuts pre-screwed in substantially a nut plane by a projection length.

During the erection of buildings, machines facilities, plants or similar structures large amounts of bolt connections, especially such ones arranged in curved flange connections involving large quantities of bolts of large size, need to be tightened. Often this has to be done in places difficult or dangerous to access, as for example during the erection of wind turbines, oil platforms, pipelines, etc. Today, in such bolt connections the nuts are typically applied and pre-screwed on the bolts manually. This is followed by a manual procedure that applies a specified preload to the pre-screwed nuts. A high level of quality is needed in the bolt tightening process in order to ensure the stiffness and strength of the connection. Hence, such tightening processes performed by human are very risky, often faulty as well as time-consuming and expensive.

EP 2 607 685 B1 discloses a robot to bolt down a series of nut bolts in a joint circular flange connection of a wind turbine. This robot comprises at least two wheels and a drive to move the robot along the series of nut bolts. The robot can carry a tool to bolt down the nut bolts with a predefined torque.

This known robot has the disadvantage that the wheels, which move the robot along the joint circular flange connection, require a certain amount of space and a relatively well defined surface aside the nut bolts in order to roll on the joint circular flange connection. Thus, the known robot cannot be applied to flange connections close to walls or similar obstacles, or to bolt connections arranged in confined space.

It is an objective of the presented invention to provide a robot to move a support platform along a series of nuts pre-screwed on bolts arranged in a curved flange connection that avoids the drawback of the known robot.

This objective is achieved with holding means that comprise at least one pair of guiding rails connected to the support platform in a distance from each other of more than the diameter of the bolts and less than the width across flat of the nuts and projecting more than the projection length from the support platform.

It is furthermore an objective of the presented invention to provide a method to move a robot with a support platform along a series of nuts pre-screwed on bolts arranged in a linear or curved flange connection.

This objective is achieved with a method that comprises the following steps:
Hold the robot on the nuts and bolts that project from the nuts;
Engage into a space between neighboring bolts of the curved flange connection to move the robot.

The robot according to the invention comprises the advantage that the support platform can be moved along a series of nuts pre-screwed on bolts arranged in a curved flange connection close to a wall or arranged in a confined space. It is furthermore advantageous to add one or more tools, such as a bolt stretch tool, a torque wrench or a tightening wheel, a robot control system, a camera, a position sensor, etc., to the support platform. Thus, all pre-screwed nuts of a curved flange connection close to a wall or arranged in a confined space can be tightened fully automatically with the requested preload.

In an advantageous embodiment the drive element of the robot according to the invention is mounted at the support platform before the holding means along a primary drive direction of the robot. Furthermore, the drive element may comprise a motor built to drive engage means that engage into a space between neighboring bolts of the curved flange connection to move the robot. Advantageously, the engage means comprise a star-shaped radial plate rotated by the motor, wherein the star-shaped radial plate comprises at least two or more and preferably five, arms that gear in-between the space between neighboring bolts in the radial direction of the curved flange connection to move the robot. Thus, the robot can move the platform very close along a wall or a similar obstacle.

These and further advantageous embodiments of the invention will be explained based on the following description and the accompanying drawings. The person skilled in the art will understand that various embodiments may be combined.

FIG. 12A shows detail I of FIG. 11B.

Figure 1:
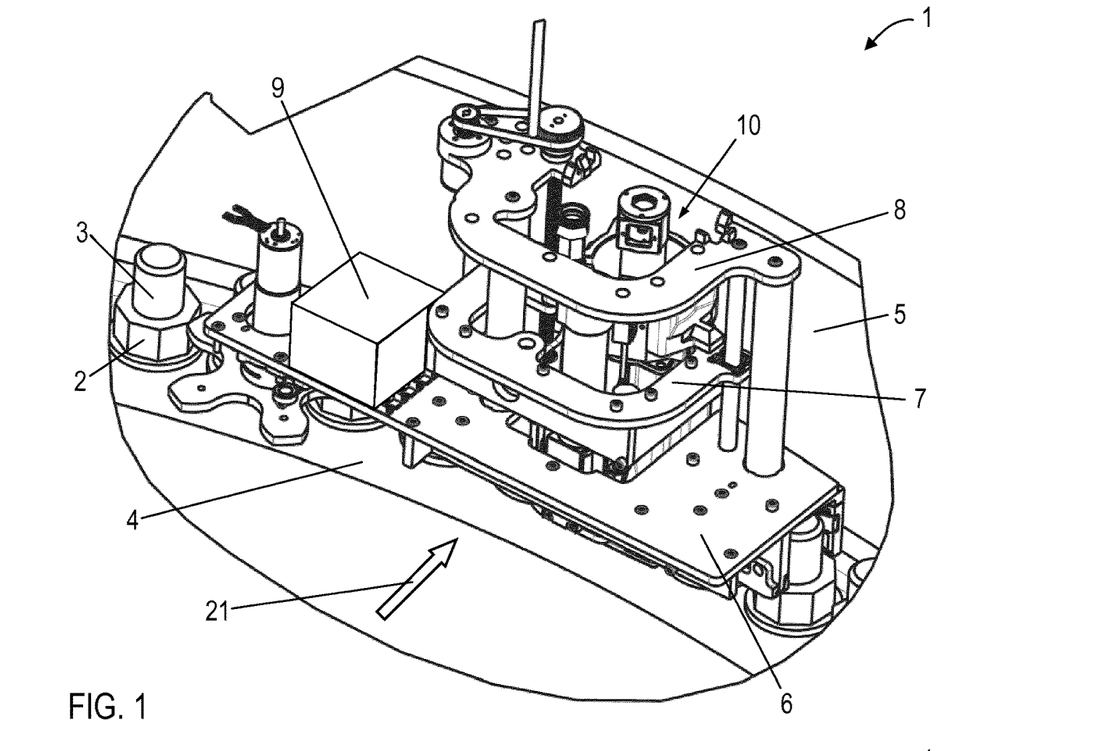
FIG. 1 shows in a perspective view a robot according to a first embodiment of the invention.

FIG. 1 shows a robot 1 according to a first embodiment of the invention. In this embodiment the robot 1 is used to tighten nuts 2 pre-screwed on bolts 3 arranged in a curved flange connection 4. The curved flange connection 4 is situated closely next to a wall 5. This wall 5 could for example be a wall of a tube segment of a wind turbine tower. The robot 1 comprises a support platform 6, a drive to move the robot 1 along the curved flange connection 4, a movable mounting platform 7, a top plate 8, whereas the movable mounting platform 7 and the top plate 8 are supported by the support platform 6. The robot 1 furthermore comprises a robot control system 9 to control the tightening procedure and to store and document parameters, and a tool 10 to stretch each bolt 3 with a predefined force and subsequently tighten the corresponding nut 2 with a predefined torque.

Figure 2:
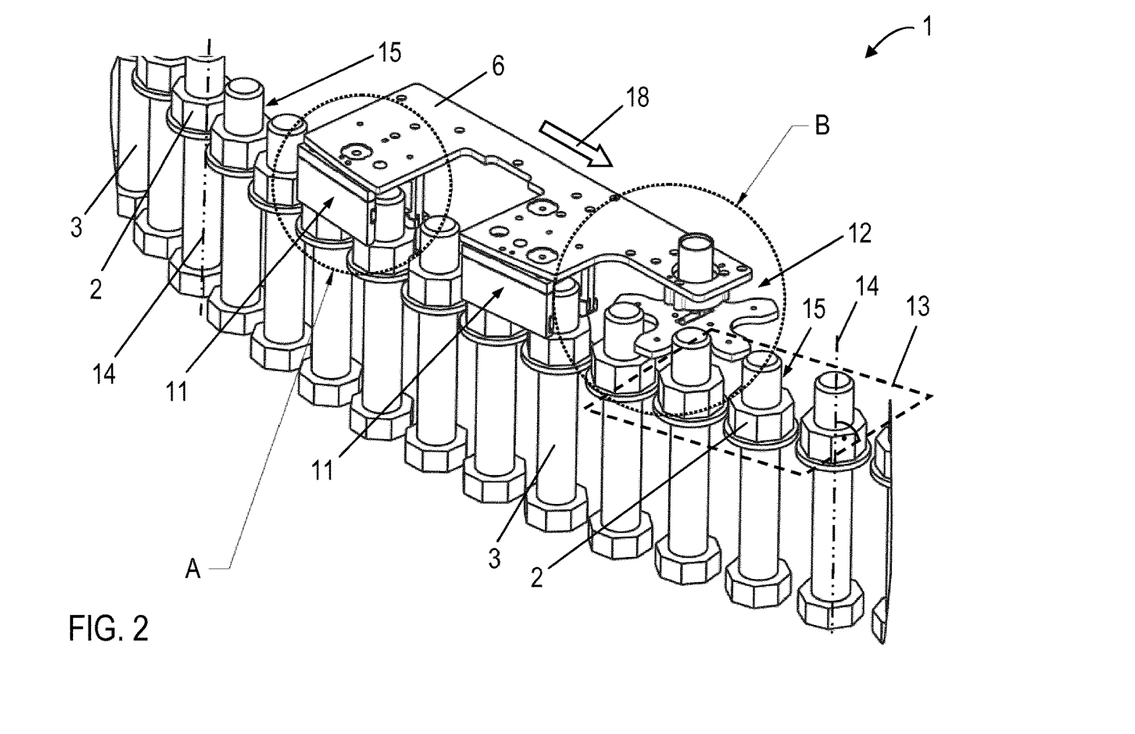
FIG. 2 shows in a perspective view the robot according to a second embodiment of the invention.
Figure 3A:
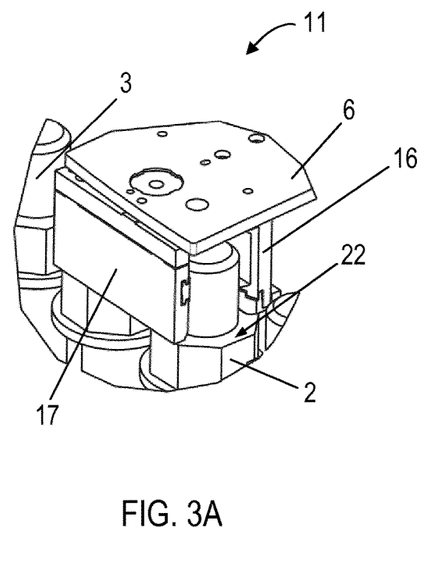
FIG. 3A shows detail A of FIG. 2.
Figure 3B:
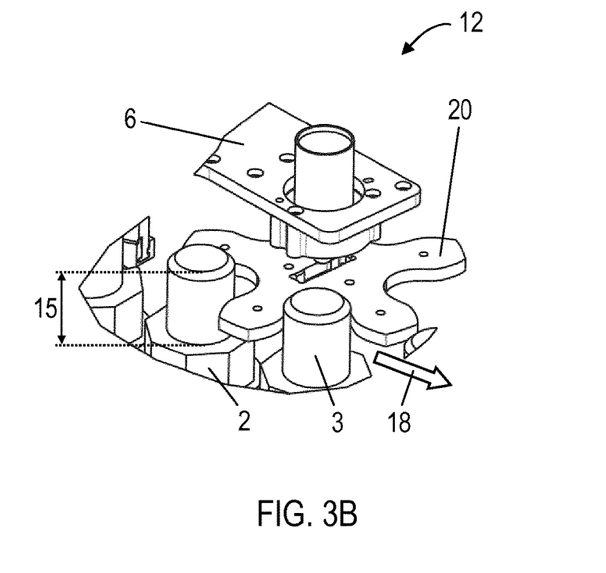
FIG. 3B shows detail B of FIG. 2.
Figure 4:
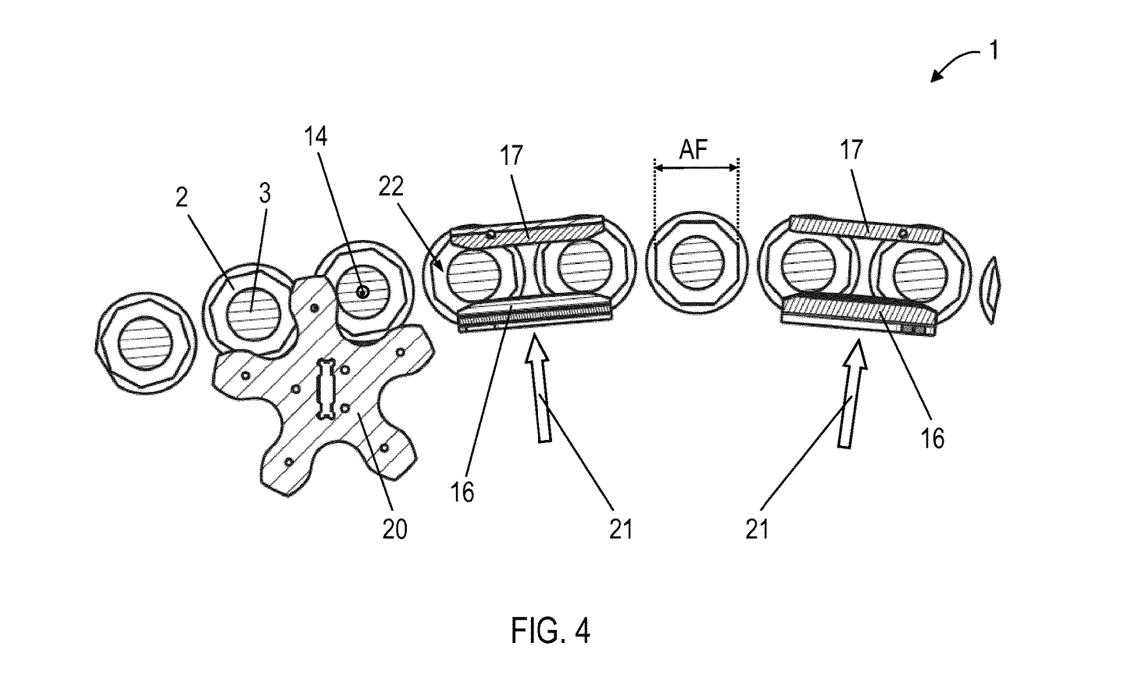
FIG. 4 shows in a top view a section parallel to the nut plane of FIG. 2.

FIG. 2 shows the robot 1 according to a second embodiment of the invention. For clarity reasons the curved flange connection 4 is not shown. In this embodiment robot 1 comprises the support platform 6 and the drive. The drive comprises holding means 11, shown in more detail in FIG. 3A, and a drive element 12, shown in more detail in FIG. 3B. In addition, FIG. 4 shows in a top view a section parallel to a nut plane 13. Nut plane 13 is substantially perpendicular to bolt axes 14. In FIG. 4 the nut plane 13 coincidences with the image plane. Nuts 2 are pre-screwed in substantially the nut plane 13 and the bolts 3 project from the nuts 2 by a projection length 15. Substantially in the nut plane 13 means that there is a particular tolerance that allows some or the nuts 2 to be pre-screwed onto the bolts 3 a bit more than others.

In the second embodiment holding means 11 of robot 1 comprise two pairs of guiding rails 16 and 17, both connected to the support platform 6 and spaced apart from each other. In principle robot 1 works with any number of pairs of guiding rails 16 and 17. At each pair of guiding rails 16, 17 an inner guiding rail 16 and an outer guiding rail 17 are connected to the support platform 6 in a distance from each other of more than the diameter D of the bolts 3 and less than the width across flat AF of the nuts 2 and they project downwards, substantially parallel to the axes 14 of the bolts 3, more than the projection length 15 from the support platform 6. Hereby, the outer guiding rail 17 is in a radial direction 21 situated further away from a center of the curved flange connection 4 as the inner guiding rail 16. The inner guiding rail 16 holds the robot 1 against forces in the radial direction 21 and the outer guiding rail 17 holds the robot against forces against the radial direction 21. Consequently, the holding means 11 hold the robot 1 on a cover surface 22 of the nuts 2 and ensure that platform 6 does not touch the bolts 3. This enables a save movement of robot 1 along the curved flange connection 4 without much friction.

To better guide robot 1 along the curved flange connection 4 guiding rails 16 and 17 may be tiltable connected to the support platform 6 in order to tilt them around an axis A essentially parallel to the axes 14 of the bolts 3. In addition, the inner guiding rail 16 and the outer guiding rail 17 according to the second embodiment of the invention comprise inner safety means 23 and outer safety means 24 in order to secure robot 1 from falling or tilting. Falling or tilting may appear if the resulting center of gravity M of robot 1 creates a to big turning moment.

Figure 5A:
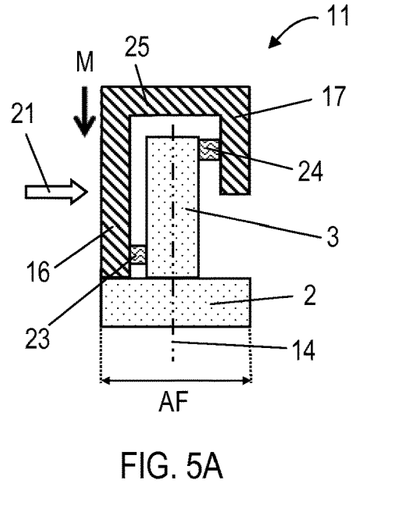
FIG. 5A shows in a cross section parallel to a bolt axis an inversely U-shaped guiding bracket in a first embodiment.
Figure 5B:
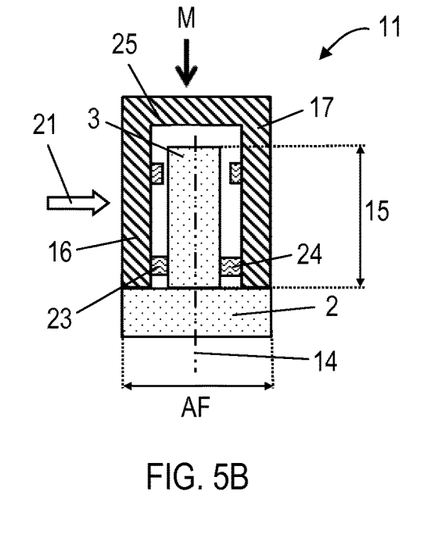
FIG. 5B shows in a cross section parallel to a bolt axis an inversely U-shaped guiding bracket in a second embodiment.

In order to improve the structural stability of the guiding rails 16 and 17, holding means 11 may be realized as inversely U-shaped guiding brackets, which are tiltable connected to the support platform 6. Such inversely U-shaped guiding brackets are shown in FIGS. 5A and 5B. The inversely U-shaped guiding brackets may be assumed to be formed from three legs, whereas an inner leg forms the inner guiding rail 16 and an outer leg forms the outer guiding rail 17 and whereas the inner leg and the outer leg are connected by a connection leg 25. The inner leg and the outer leg have an inner length greater than the projection length 15, and the connecting leg 25 has an inner length greater than the diameter D of the bolts 3 and an outer length less than the width across flat AF of the nuts 2. FIG. 5A shows the inversely U-shaped guiding bracket in a first embodiment, whereas the center of gravity M acts along an axis that in the radial direction 21 is situated closer to the center of the curved flange connection 4 as the axes 14 of the bolts 3. This enables to realize holding means 11 with outer guiding rail 17 shorter than inner guiding rail 16 what may help to ease the process to tighten nuts 3. FIG. 5B shows the inversely U-shaped guiding bracket in a second embodiment, whereas the center of gravity M acts along an axis that in the radial direction 21 is situated nearby or at the same distance to the center of the curved flange connection 4 as the axes 14 of the bolts 3.

Advantageously, drive element 12 is mounted at the support platform 6 before the holding means 11 along a primary drive direction 18 of the robot 1. Alternatively, the drive element 12 may be mounted at the support platform 6 after or in-between the holding means 11 along the primary drive direction 18. The drive element 12 comprises a motor, not shown in the figures, built to drive engage means that engage into a space between neighboring bolts 3 of the curved flange connection 4. The engage means advantageously comprise a star-shaped radial plate 20, which may comprise at least two, preferably five, arms that gear in-between the space between neighboring bolts 3 in the radial direction 21 of the curved flange connection 4. By engagement of the arms and simultaneous rotation of the radial plate 20 the support platform 6, and consequently the robot 1, is pulled by the drive element 12 and guided by the holding means 11 in order to move along the curved flange connection 4.

The drive element 12 according to the invention may be realized in different ways. For example the engage means may engage at the curved flange connection 4 by adhesion, friction or other physical and/or chemical forces or mechanisms. The motor may be an electric or pneumatic or hydraulic motor that directly transmits its rotation to the engage means or that transmits its rotation by gears, belts or similar elements. The holding means 11 may move the robot 1 without the drive element 12, for example by a clamp-and-release mechanism of each pair of guiding rails 16, 17.

FIGS. 6 to 9 show the robot 1 according to a third embodiment of the invention. The robot 1 comprises the support platform 6, the movable mounting platform 7, the top plate 8, which mounting platform 7 is supported by the support platform 6, and the tool 10. For clarity reasons the drive and the curved flange connection 4 are being omitted. The tool 10 comprises a tension nut 26 and a tightening wheel 35. The robot 1 comprises positioning means to substantially align the axis 28 of the tension nut 26 with the axes 14 of the bolts 3 to screw the tension 26 nut onto the bolts 3.

In the third embodiment of the invention positioning means of the robot 1 comprise three connection means 27, which are attached to the tool 10. By these connection means 27 the tool 10 is pin-ended on the movable mounting platform 7, whereas rotation within the plane of the mounting platform 7 is prohibited due to this threefold bearing. The connection means 27 comprise a rounded element 29 which acts as the pin of the pin-ended bearing and enables tipping of the tool 10 to align the axis 28 of the tension nut 26 with the axis 14 of the bolt 3 while the tool 10 is lowered and the tension 26 nut is screwed onto the bolt 3.

Figure 6:
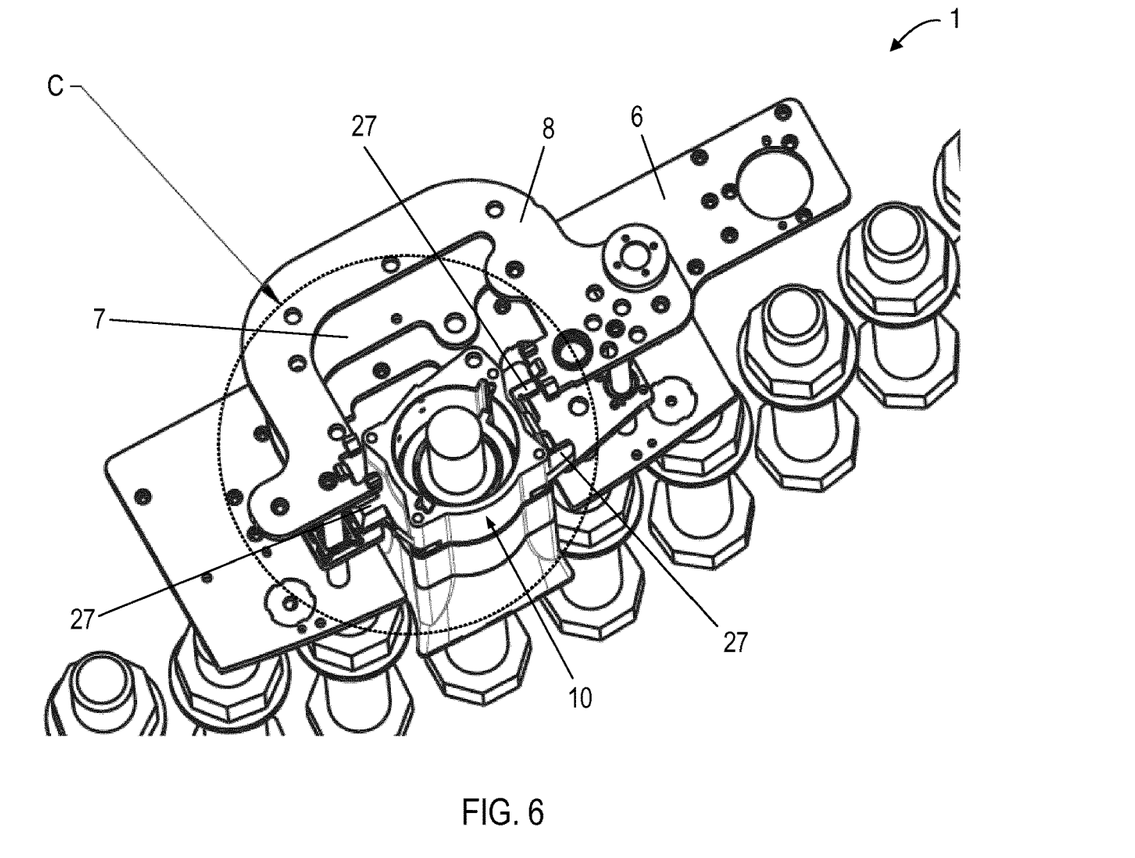
FIG. 6 shows in a perspective view the robot according to a third embodiment of the invention.
Figure 7:
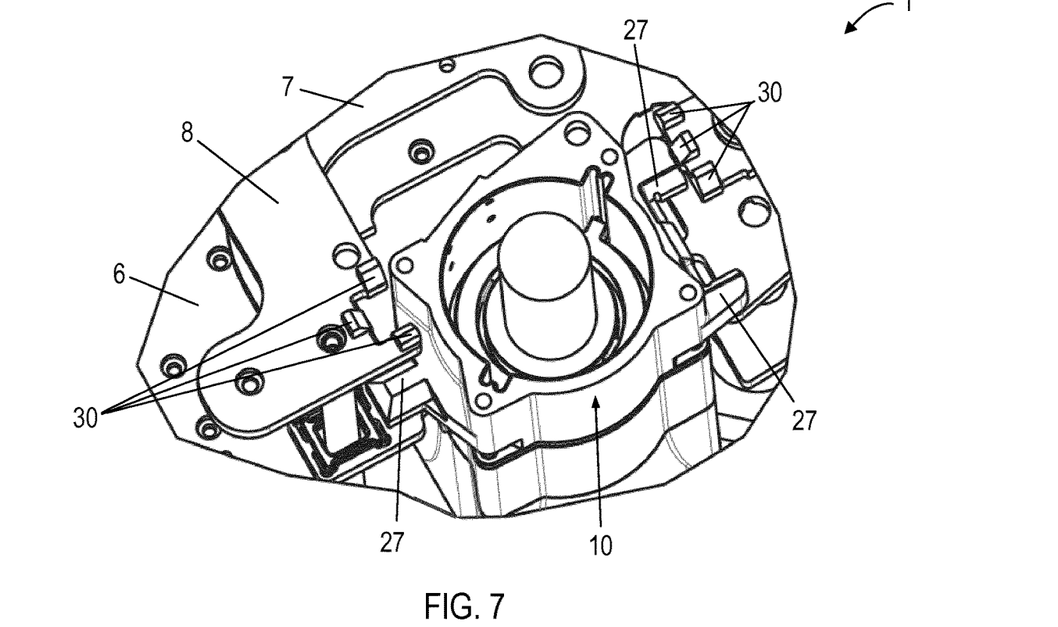
FIG. 7 shows detail C of FIG. 6.
Figure 8:
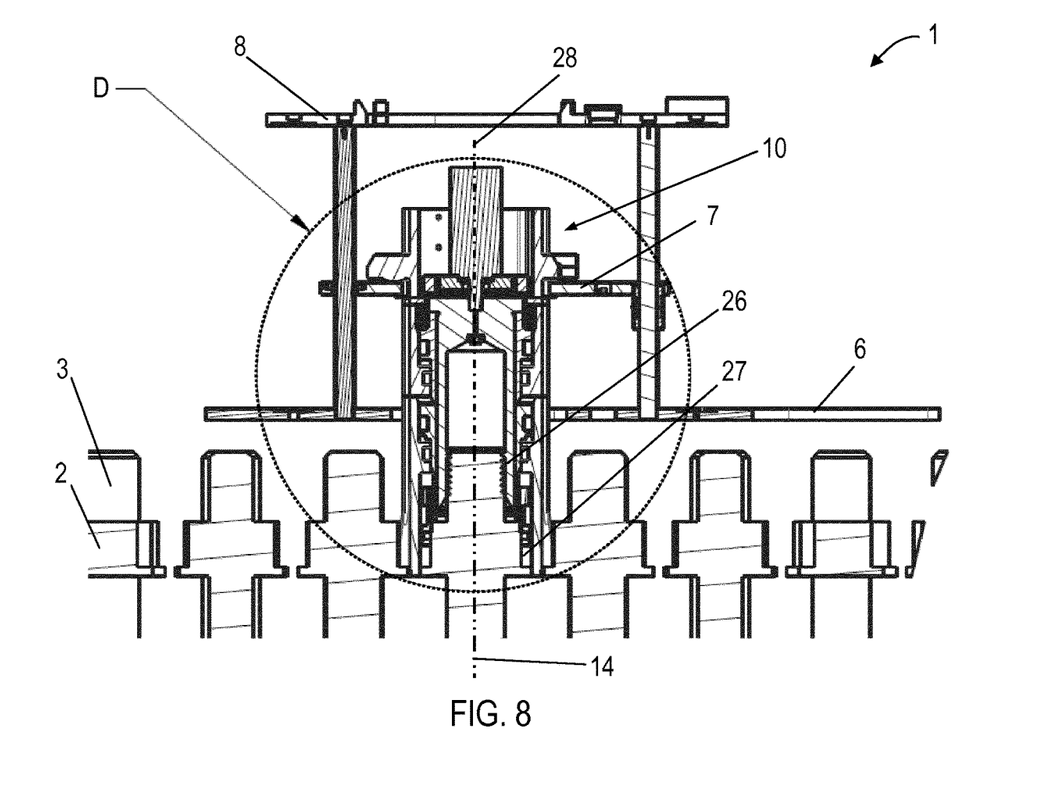
FIG. 8 shows in a cross section parallel to a bolt axis the robot of FIG. 6.
Figure 9:
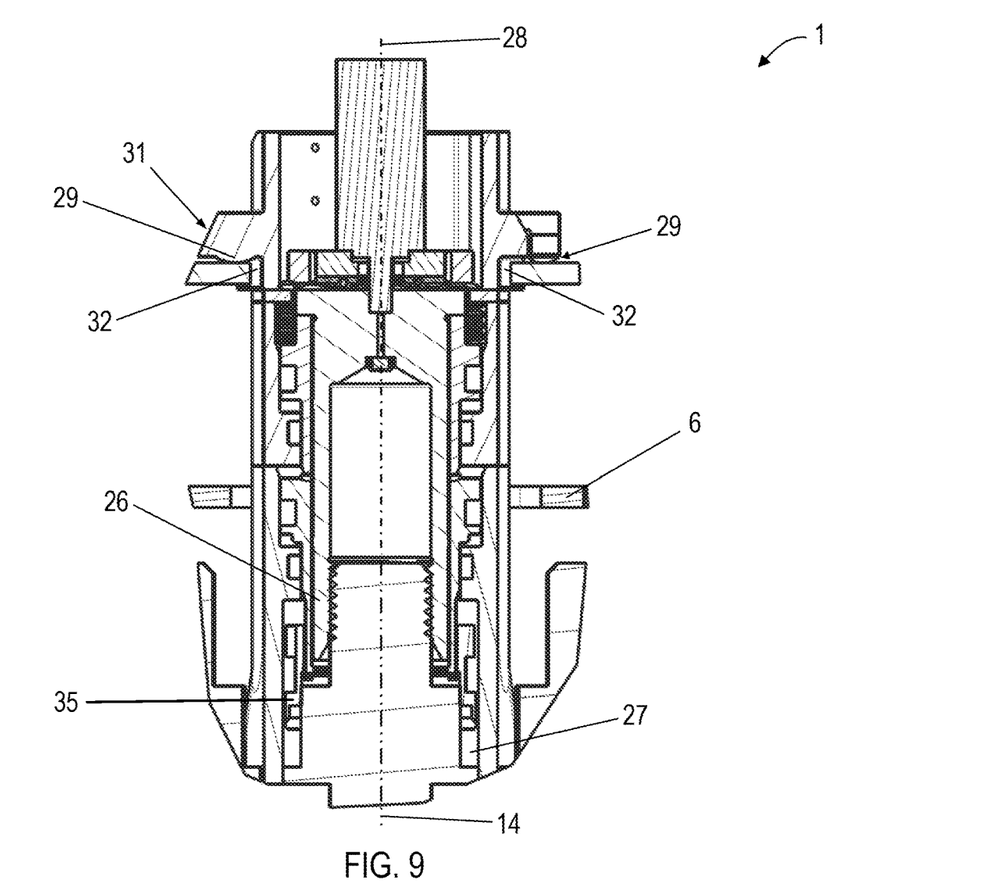
FIG. 9 shows detail D of FIG. 8.
Figure 10:
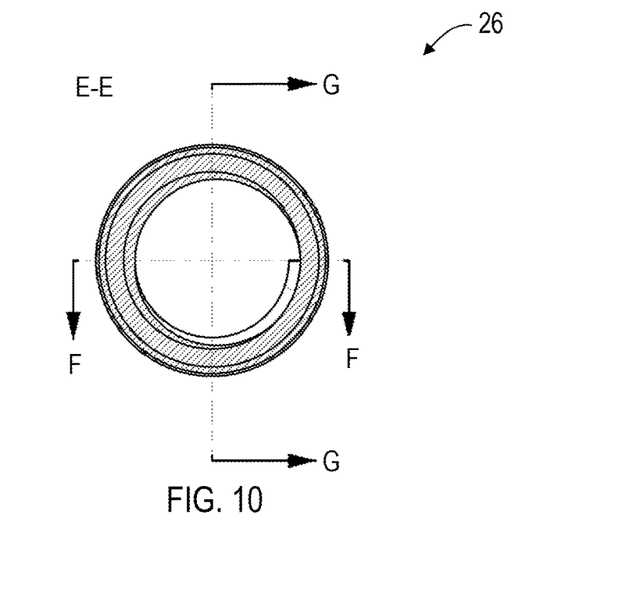
FIG. 10 shows in a cross section along E-E (FIG. 11B) a tension nut.
Figure 11A:
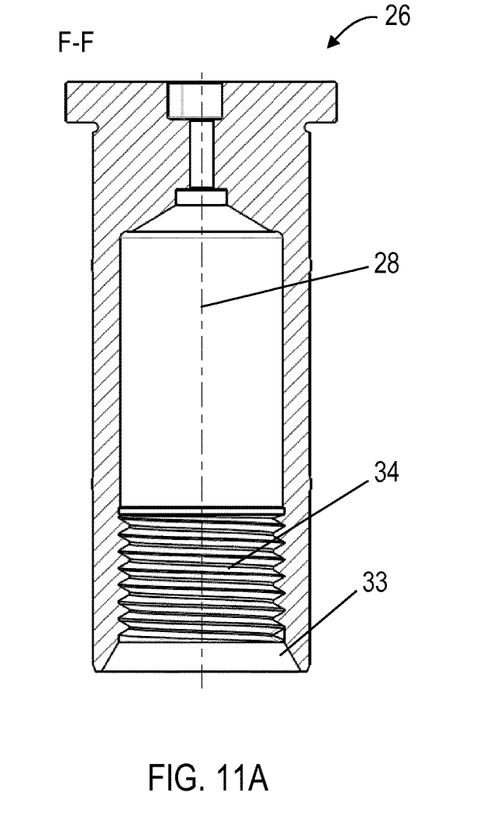
FIG. 11A shows in a longitudinal section along F-F the tension nut of FIG. 10.
Figure 11B:
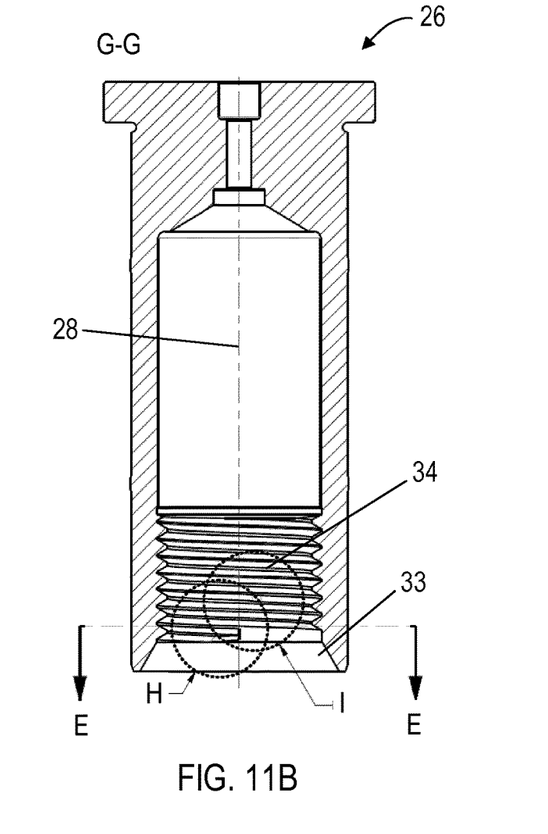
FIG. 11B shows in a longitudinal section along G-G the tension nut of FIG. 10.

Since the movable mounting platform 7 is movable substantially along the axis 28 of the tension nut 26, also the tool 10 is movable substantially along this axis 28. The movable mounting platform 7 may be moved by two axial ball bushings on a rod mounted on the support platform 6, and it may be actuated by using a spindle driven by an electric motor, not shown in the figures. The movable mounting platform 7 can be moved to an upmost resting position. The movable mounting platform 7 is moved into the resting position during the movement of the robot 1 along the curved flange connection 4 and/or if the tool 10 is realigned. The top plate 8 comprises locking means 30 to lock the tool 10 in the resting position. In addition, the connection means 27 comprise an angled surface 31 that interacts with the locking means 30 in order to force the tool 10 into a zero position. Hence, the zero position realigns the tool 10 and is automatically taken as soon as the movable mounting platform 7 is in its resting position. This allows the tool 10 to self-align to the bolts 3 without straining the robot 1 and loosening accuracy demands.

As soon as the movable mounting platform 7 is moved out of the resting position, the tool 10 is able to tip. Hence, by lowering the tool 10 onto the bolt 3, the axis 28 of the tension nut 26 is able to align with the axis 14 of the bolt 3. The connection means 27 may comprise securing means 32 in order to confine the tipping of the tool 10 and prevent the tool 10 from excessive tilting, rotating or from falling off the robot 1. The securing means 32 may have a female-female or a male-male interface between the tool 10 and the mounting platform 7.

Figure 12A:
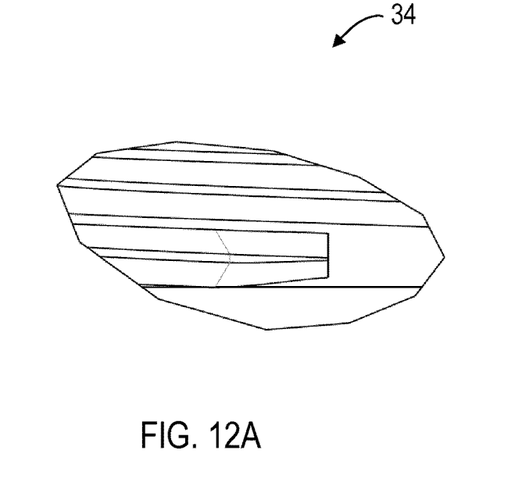
FIG. 12A shows detail H of FIG. 11B.
Figure 12B:
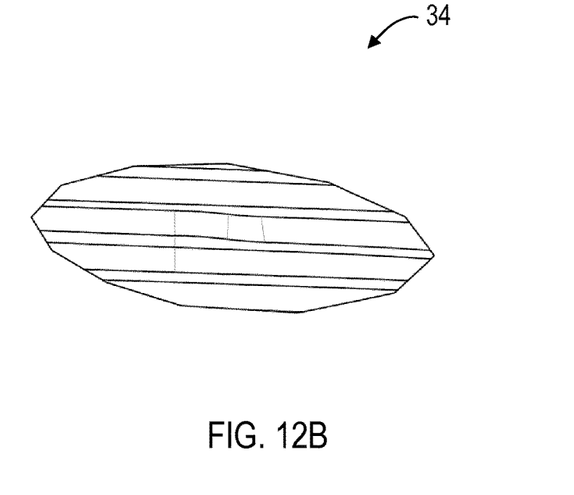

The positioning means may additionally comprise one or all of the following four features of the tension nut 26 helping to precisely align the axis 28 of the tension nut 26 to the axis 14 of the bolt 3 when lowering the tool 10 onto the bolt 3 as shown in FIGS. 10 to 12B:

1) An angled surface section 33 as introductory part before the turns of thread 34 on the tension nut 26 start.
2) A first turn of the thread 34 of the tension nut 26 that is formed to ease the insertion of the thread of the bolt 3, wherein the first turn of the thread 34 of the tension nut 26 compared with a standard metric thread comprises a larger chamfer with a steep angle W to ease the insertion of the thread of the bolt 3 as shown in FIG. 12A.
3) The first one or two turns of the thread 34 of the tension nut 26 that compared with the full cross section $C_F$ of a standard metric thread have a reduced cross section $C_R$ by a parallel offset of one of the walls of the thread 34 to create more clearance as shown in FIG. 12B. Gravity ensures that always the lower side of the thread 34 is in contact with the bolt 3, and that there is no notable contact on the upper side of the thread 34. After the first one or two turns of the thread 34 the full cross section of the thread 34 is being obtained by a slow transition at the upper side of the thread 34. Hereby, there is no noticeable transition between reduced cross section $C_R$ and the full cross section $C_F$.
4) The first turn of the thread 34 of the tension nut 26 compared with a standard metric thread that is built in a way to avoid forces onto the first turn of the thread 34 along the axis 28 of the tension nut 26 during elongation of the bolt 3 after more than two turns have been screwed onto the bolt 3. Hereby, a possible deformation of the first turn of the thread 34 is prohibited, improving the possibility of thread engagement between the tension nut 26 and the bolt 3.

A robot 1 according to the first embodiment and the third embodiment of the invention is suited to automatically tighten a series of nuts 2 pre-screwed on bolts 3 arranged in a curved flange connection 4. Such a method may be characterized in that the following steps are processed:

1) After the robot 1 is positioned on the curved flange connection 4 the robot 1 itself positions the tool 10 in a way to substantially align the axis 28 of the tension nut 26 of the tool 10 with the axis 14 of the bolt 3. This first coarse positioning of the tool 10 may be done by a position sensor or by a software routine, whereas the robot 1 is moved along the curved flange connection 4 by the drive. Subsequently, the fine positioning of the tool 10 is done by the positioning means as described before.
2) The tool 10 screws the tension nut 26 onto only a part or all of the thread of the projection length 15 of the bolt 3, wherein the axis 28 of the tension nut 26 is tipped in order to match with the thread of the projection length 15 of the bolt 3. The rotation of the tension nut 26 may be done by a motor.
3) The tool 10 pulls the bolt 3 along the axis 28 of the tension nut 26. This causes a stretching and physical elongation of the bolt 3, in practice for example in excess of 2 mm. This stretching causes the bolt 3 to lift off of the curved flange connection 4. For pulling the bolt 3 a hydraulic device may be used, wherein hydraulic oil from a small pump acts upon a piston connected to the tension nut 26. Thus, the stretching or physical elongation in the bolt 3 is effectively controlled by hydraulic pressure, if the tension is proportional to the hydraulic pressure.
4) The corresponding nut 2, which is simultaneously lifted of the curved flange connection 4 with the bolt 3, is rotated and tightened by the tightening wheel 35 until it again has contact with the curved flange connection 4 and a predefined torque is achieved. The tightening wheel 35 may be rotated by gears driven by a motor.

As soon as the pull on the bolt 3 is relaxed, the bolt 3 carries the same load as the tool 10 previously exerted on the bolt 3 and the physical elongation and tension remains. The robot 1 may now be moved to the next bolt 3.

The robot 1 works similar, if the nuts 2 are to be loosened. In this case, the nut 2 is turned by the tightening wheel 35 away from the curved flange connection 4 by a controlled amount that is larger than the physical elongation of the bolt 3.

The term tighten or tightening in the claims and description should be understood to cover the meaning of the terms bolt down or torqueing or preload or pre-stress or screw down.

The robot 1 according to the invention may also carry a tool comprising a bolt tightening tool, torque wrench, a robot control system, a camera, a position sensor, measuring instrument or combinations thereof. Thereby, robot 1 may also be used for inspection or service purposes. Robot 1 may be used for any kind of flange connection in any kind of technical building, facility, plant or any similar structure. Robot 1 for instance could be used to flange connections of tube segments of oil platforms, pipelines, wind turbines, windmills, or towers used as antenna mast or look-out.

A robot according to a further embodiment of the invention could be adopted to move a support platform along a series of nuts arranged in a linear flange connection or a rectangular flange connection. This has the advantage that nuts of a linear flange connection to e.g. mount a large motor to concrete in the ground could be tightened by the robot.

The term "nut" does not only include elements as standardized with an internal screw thread and a hexagonal outer surface, but does include any element with an internal screw thread and an outer surface of any form. This includes for instance an element with an internal screw thread and a cylindrical outer surface. The tightening wheel could for instance comprise a rubber surface to tighten the pre-screwed nut with the cylindrical outer surface with a predefined torque. The term "bolt" also includes elements that only for part of their length comprise an external thread to enable the tightening of the nuts. Such a bolt could also be a step shaped cylindrical shaft with a threaded end.

The mast of a wind turbine may have elements of conical shape with a diameter that reduces the higher the mast gets. In this case walls 5 would be slightly inclined towards the center and bolt axes 14 would be slightly inclined as well. As a result the nut plane would still be substantially perpendicular to bolt axes 14 close by, but not a complete flat plane.

The invention claimed is:

1. A robot to move a support platform along a series of nuts pre-screwed on bolts arranged in a linear or in a curved flange connection, which bolts project from the nuts pre-screwed in substantially a nut plane by a projection length, the robot comprising:
   a drive to move the robot along the flange connection,
   wherein the drive comprises at least one drive element and holding means both connected to the support platform, wherein:
   the at least one drive element comprises a motor built to drive engage means that engage into a space between neighboring bolts of the curved flange connection to move the robot;
   the holding means comprises at least one pair of guiding rails connected to the support platform at a distance from each other of more than a diameter of the bolts and less than a width across flat of the nuts and projecting more than the projection length from the support platform.

2. The robot according to claim 1, wherein the holding means comprises at least two pairs of guiding rails both connected to the support platform and spaced apart from each other.

3. The robot according to claim 1, wherein the guiding rails are tiltable connected to the support platform to tilt them around an axis essentially parallel to the axes of the bolts.

4. The robot according to claim 1, wherein the flange connection is the curved flange connection and wherein an outer guiding rail of the at least one pair of guiding rails is situated further away from a center of the curved flange connection than an inner guiding rail of the at least one pair of guiding rails, and wherein the inner guiding rail holds the robot against forces in a radial direction and wherein the outer guiding rail holds the robot against forces against the radial direction.

5. The robot according to claim 4, wherein the outer guiding rail and/or the inner guiding rail comprises safety means in order to secure the robot from falling or tilting.

6. The robot according to claim 1, wherein the at least one pair of guiding rails is realized as an inversely U-shaped guiding bracket connected to the support platform.

7. The robot according to claim 1, wherein the at least one drive element is mounted at the support platform before the holding means along a primary drive direction of the robot.

8. The robot according to claim 1, wherein the engage means comprises a star-shaped radial plate rotated by the motor, wherein the star-shaped radial plate engages into the space between neighboring bolts to move the robot.

9. The robot according to claim 8, wherein the flange connection is the curved flange connection and wherein the star-shaped radial plate comprises at least two arms that gear in-between the space between neighboring bolts in a radial direction of the curved flange connection.

10. The robot according to claim 1, wherein the support platform supports at least one tool.

11. The robot according to claim 10, wherein the support platform supports a movable mounting platform that supports the at least one tool.

12. The robot according to claim 10, wherein the at least one tool comprises at least one of the following:
   a bolt stretch tool to stretch the bolts with a predefined force,
   a torque wrench or a tightening wheel to tighten the nuts with a predefined torque,
   a robot control system,
   a camera, and
   a position sensor.

13. A system comprising:
   a curved flange connection and a robot to move a support platform along a series of nuts pre-screwed on bolts arranged in the curved flange connection, wherein the bolts project from the nuts pre-screwed in substantially a nut plane by a projection length,
   wherein the robot comprises a drive to move the robot along the curved flange connection and the drive comprises at least one drive element and holding means both connected to the support platform, wherein the robot comprises the elements as claimed in claim 1.

14. A method to move the robot of claim 1 along a series of nuts pre-screwed on bolts arranged in a curved flange connection, wherein the bolts project from the nuts pre-screwed in substantially a nut plane by a projection length, the method comprising:
   holding the robot on the nuts and bolts that project from the nuts; and
   engaging the engage means into a space between neighboring bolts in a radial direction of the curved flange connection to move the robot on the nuts.

* * * * *